3,823,037
IMPLANTABLE BATTERY
Elton J. Cairns, Downers Grove, Albert A. Chilenskas, Western Springs, and Hiroshi Shimotake, Hinsdale, Ill., assignors to the United States of America as represented by the United States Atomic Energy Commission
Filed July 20, 1972, Ser. No. 273,669
Int. Cl. H01m 43/00
U.S. Cl. 136—6 F                                9 Claims

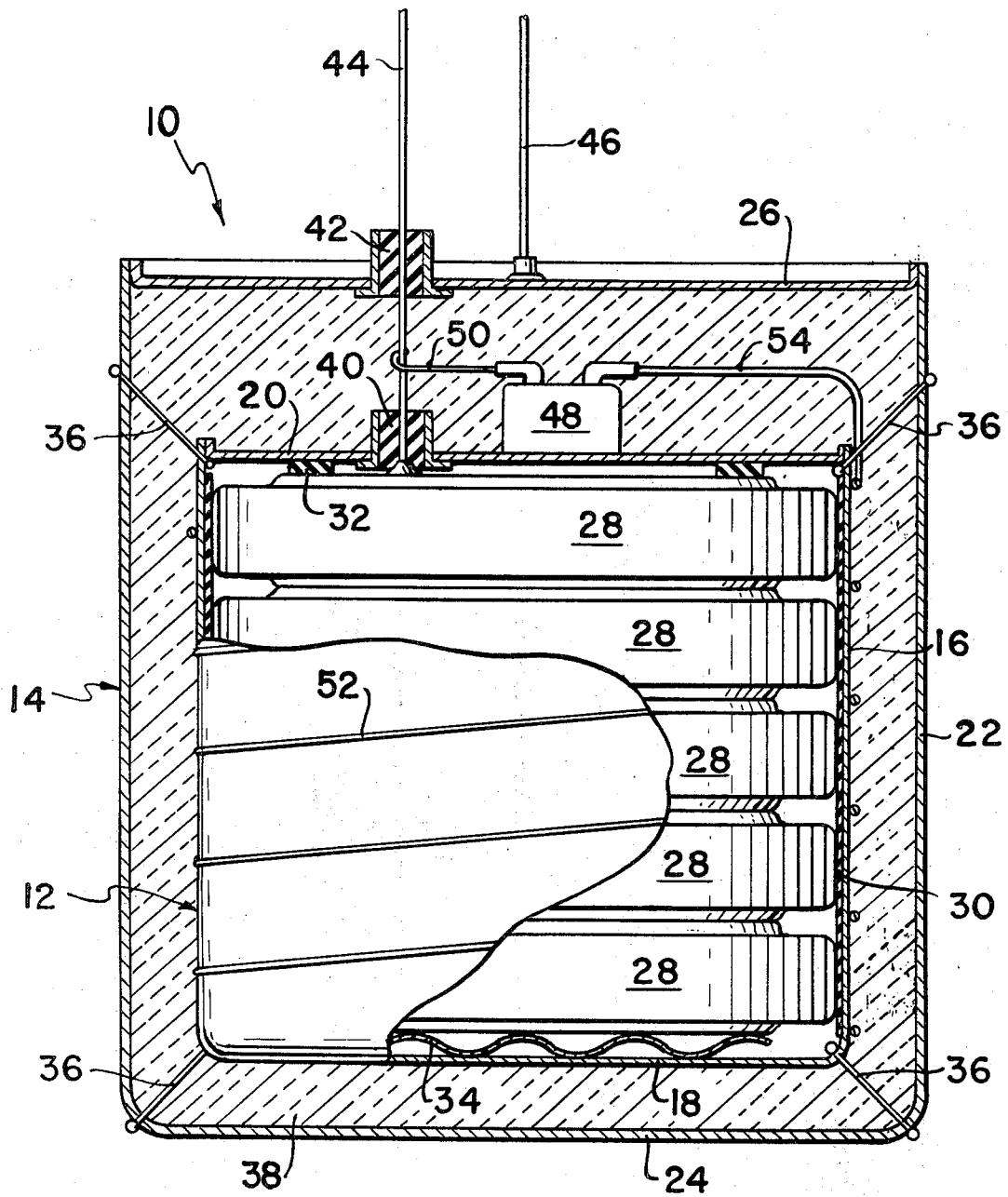

ABSTRACT OF THE DISCLOSURE

This invention consists of an implantable secondary electrochemical battery capable of use as a power source for an artificial heart. The battery includes an enclosed, evacuated cylindrical inner housing securely supported within an enclosed, evacuated cylindrical outer housing with a plurality of sealed, high-temperature secondary electrochemical cells immobolized within the inner housing and electrically connected in series. The battery further includes thermal insulation material located between the two housings, insulated electrical leads, feedthroughs located in the housings to enable the passage of one of the leads into the battery, and a thermal switch and heater wire located between the two housings to enable initial heating of the electrochemical cells to operating temperature and for maintaining this temperature throughout battery operation.

CONTRACTUAL ORIGIN OF THE INVENTION

The invention described herein was made in the course of, or under, a contract with the United States Atomic Energy Commission.

BACKGROUND OF THE INVENTION

This invention relates to a secondary electrochemical battery and more particularly to a battery which contains a plurality of individual secondary electrochemical cells. Specifically, this invention relates to an implantable secondary electrochemical battery for use as a power source for an artificial heart.

In our technologically oriented society, there is an increasing need for compact, convenient, pollution-free electrical power sources and energy-storage devices. A large number of power-source needs, both civilian and military, have gone unfulfilled because of the limited capabilities of presently available batteries and engine-generators. In an attempt to satisfy these needs, a great deal of effort has been expended over the last decade in the areas of energy conversion and energy storage. A large portion of the effort has involved electrochemical devices such as fuel cells, metal/air cells, secondary (electrically rechargeable) cells with both aqueous and nonaqueous electrolytes and thermally regenerative cells.

Although a wide variety of electrochemical cells and secondary batteries is available, none are capable of providing a high specific energy (100 watt-hours/kg.) for a large number (>1000) of charge/discharge cycles. One application requiring such specific energies and cycle life (number of charge/discharge cycles before failure) is as an implantable battery serving as the power source for an artificial heart, the battery being recharged by electromagnetic waves transmitted through the skin. The amount of energy storage required for such a battery represents a compromise among a number of considerations including freedom from external power for reasonable periods of time for hygenic reasons, patient comfort, ease of movement, safety in case of temperary power failure or unavailability, and a minium size and weight because of the limited amount of space in the body and the difficulty of providing internal mechanical support for heavy devices. Taking into account these considerations as well as others, such an implantable battery must store about 120 watt-hours of energy and be capable of producing about 30 watts of power in an environment which is at the temperature of the body (37° C.). Given an implantable battery weighing about 1 kg., the maximum allowable weight, such considerations would require a specific energy of about 120 w.-hr./kg. and a specific power of about 30 w./kg. Most commercially-produced batteries, designed for operation near room temperature, have specific energy values significantly below 100 w.-hr./kg., and many suffer a significant decrease in charge/discharge energy efficiency at body temperature.

One class of cells, however, which has shown distinct promise for development into such a battery consists of secondary cells that operate at elevated temperatures. These cells employ alkali-metal anodes such as lithium or sodium, molten-salt or cation-conducting solid electrolytes, and cathode materials of Groups VI-A and VII-A of the periodic chart, the chalcogens and halogens. Examples of such secondary cells are disclosed in U.S. patent applications Ser. No. 228,619, filed Feb. 23, 1972, now abandoned, by E. C. Gay et al., Ser. No. 178,577, filed Sept. 8, 1971 now U.S. Pat. No. 3,716,409 by E. J. Cairns et al. and Ser. No. 73,830, filed Sept. 21, 1970, now U.S. Pat. No. 3,666,560, by E. J. Cairns et al., all of which are assigned to the assignee of the present application.

While such individual secondary electrochemical cells have shown promise for meeting the requisite power and energy needs, the development of an implantable battery utilizing such cells has been inhibited by a number of problems such as the cells' high operating temperature (375°–400° C.) as well as the battery's requirement of total implantation. The inventors, however, have developed a battery containing a plurality of sealed, high-temperature secondary electrochemical cells which is capable of implantation and has a sufficiently high specific energy throughout a long cycle life to be utilized as a power source for an artificial heart.

Totally implantable artificial hearts or heart assist devices are rather complex energy-conversion devices including a flexible-wall diaphragm pump to drive the blood and a second pump to move fluid which operates the first pump. It is to the energy source of this second pump that the research work leading to development of the present battery is directed.

It is therefore one object of the present invention to provide an implantable secondary electrochemical battery.

It is another object of the present invention to provide an implantable battery containing a plurality of sealed, high-temperature secondary electrochemical cells which is capable of acting as a power source for an artificial heart.

It is finally an object of this invention to provide an implantable secondary electrochemical battery having a specific energy of about 120 w.-hr./kg. and a specific power of about 30 w./kg.

Further objects and advantages of the invention will be apparent from the following detailed description of the battery.

SUMMARY OF THE INVENTION

A battery constructed in accordance with the present invention includes an enclosed, evacuated cylindrical inner housing disposed within an enclosed, evacuated cylindrical outer housing with a plurality of sealed, high-temperature secondary electrochemical cells immobilized within the inner housing and electrically connected in series. The two housings are securely maintained in a constant spaced relationship by a plurality of wires under tension extending between the housings. Located within the evacuated space between the two housings is a multifoil thermal vacuum insulation material, while a layer of electrical insulation is interposed between the sides of the electrochemical cells and the inner housing. A spacing member separates the uppermost electrochemical cell from the cover portion of the inner housing, and a resilient member is interposed between the lowermost electrochemical cell and the bottom portion of the inner housing. A feedthrough is mounted in the cover portions of each of the two housings, while a thermal switch is located between the housings. The battery further includes an insulated electrical lead passing through both feedthroughs and contacting the uppermost electrochemical cell while having an additional electrical connection to the thermal switch, a second insulated electrical lead attached to the outer surface of the outer housing, and an electrically insulated heater wire wrapped around the outer surface of the inner housing with one end of the wire attached to the inner housing surface and one end connected to the thermal switch.

BRIEF DESCRIPTION OF THE DRAWING

The figure is a sectional view of a battery constructed in accordance with the present invention.

DETAILED DESCRIPTION OF THE INVENTION

Referring to the figure, a secondary electrochemical battery 10 comprises an inner metallic housing 12 disposed within an outer metallic housing 14. Housing 12 is composed of a cylindrical portion 16 with bottom 18 and cover 20 securely attached thereto. Likewise, housing 14 is composed of a cylindrical portion 22 having bottom 24 and cover 26 securely attached thereto. Located within housing 12 are a plurality of stacked, sealed secondary electrochemical cells 28 which are electrically connected in series. Cells 28 are insulated from cylindrical portion 16 by electrical insulation layer 30 so as to insure against short circuiting of the battery. The uppermost electrochemical cell 28 is insulated from cover 20 by a separating member 32 constructed from electrical insulating material. Resilient member 34 is located between the lowermost electrochemical cell 28 and bottom 18. Member 34 exerts pressure on stacked cells 28, forcing them against separating member 32. This insures that cells 28 will remain immobilized within housing 12 and in good electrical contact with each other.

Housing 12 is held securely in place within housing 14 by a plurality of support wires 36 which extend from the inside of housing 12 to the outside of housing 14. Wires 36 are under tension and located evenly and symmetrically about bottom 18 and cover 20 so as to maintain a constant spaced relationship between the two housings regardless of the battery's position. In addition, wires 36 provide for minimum heat dissipation.

The evacuated space between housing 12 and 14 is filled with multifoil vacuum insulating material 38. Insulation 38 must retain sufficient heat within housing 12 so as to maintain therein a temperature of 375°–400° C. while the temperature of the body environment outside housing 14 remains at normal body temperature of about 37° C. In addition, two electrically insulating feedthroughs 40 and 42 are located in housing covers 20 and 26, respectively. The feedthroughs enable positive lead 44 to extend into housing 12, yet they inhibit the transfer of materials or body liquids in or out of either housing while also providing for minimal heat loss. Negative lead 46 is attached to outer housing cover 26, as housings 12 and 14 are at the potential of the negative battery terminal.

Thermal switch 48 is disposed between housings 12 and 14 with electrical connection 50 connecting one terminal of thermal switch 48 to positive lead 44. Electrically insulated heater wire 52 is wrapped around the outer surface of cylindrical portion 16 and has one end electrically connected to the second terminal of thermal switch 48 by way of connection 54 while the other end of heater wire 52 is secured to the outer surface of housing 12. Before battery 10 is implanted, it is initially at room temperature and therefore inoperable. In order to bring cells 28 up to operating temperature of 375°–400° C., a current is fed from an outside source (not shown) into leads 44 and 46. Thermal switch 48 remains in the closed position and thereby enables the outside current to flow through heater wire 52 and heat housing 12 and cells 28. When cells 28 reach operational temperature, thermal switch 48 automatically opens and thereby interrupts the current flow through heater wire 52, the outside current source to leads 44 and 46 being removed when this occurs. At this point, a current is generated through leads 44 and 46 by cells 28, and a 375°–400° C. temperature is maintained within housing 12 by way of heat generated internally by cells 28. Battery 10, being operational, can then be implanted.

An analysis of the power requirements for pumping blood in an average human adult in light to moderate exercise shows that a time-average power of about 4 watts is necessary in order to pump the blood at a time-average rate of about 13 liters/min. In a case of extremely demanding exercise, which would be very unlikely for an individual having an artificial heart, about 10 watts maximum would be required to maintain the proper blood rate. Given such a maximum power requirement and a maximum battery weight of about 1 kg., such a battery must be capable of producing a specific power of at least 10 w./kg. However, due to energy conversion inefficiencies which exist in the auxiliary equipment associated with an artificial heart, the battery should have a specific power of about 30 w./kg. in order to be capable of providing 10 watts maximum to the blood during possible periods of extremely demanding exercise. Further requirements for such a battery include a twelve-hour discharge/charge rate and a specific energy of about 120 w.-hr./kg. Since the battery is to be implanted, it should have a lifetime of not less than about 3 years which at the twelve-hour discharge/charge rate means a cycle life of about 1100 cycles or greater.

The individual electrochemical cells illustrated in the figure are of the type disclosed in U.S. patent application Ser. No. 73,830, and while the present invention is to be described with reference to these particular cells and the embodiment illustrated in the figure, the invention is not to be limited thereto. Any secondary electrochemical cells capable of meeting the performance requirements for use with the present invention would be acceptable for such utilization. It should be noted, however, that depending upon the type and configuration of the particular secondary electrochemical cells utilized, the positive battery lead connection and the manner of electrical contact between individual cells may differ from that shown in the figure. For example, the cells illustrated in the figure maintain a positive potential on their upper surfaces and a negative potential on their bottom surfaces. Therefore, the positive battery lead is merely connected to the uppermost cell's upper surface, while the negative battery lead is attached to the outer housing's outer surface to which a negative potential has been imparted from the bottom surface of the lowermost electrochemical cell through the resilient member, the inner housing and the support wires. In addition, the particular cells illustrated can be merely stacked directly on top of each other for the purpose of connecting them electrically in series. However, if the configurations and location of positive and negative potentials of the secondary cells utilized are different from those of the illustrated cells, the manner of attachments illustrated may not be sufficient and may require alteration in accordance with the principles taught herein.

In the particular battery illustrated, the vacuum created within the outer housing prior to sealing is about $10^{-4}$ torr. This means that the outer housing must be capable of withstanding an external pressure of about 15 p.s.i., and since the outer housing is not exposed to any of the individual secondary cells' reactant materials, such as selenium and lithium for the cells of U.S. patent application Ser. No. 73,830, there are no other critical requirements for the outer housing other than that of the external pressure resistance requirement. A preferred means of sealing the housing's bottom and cover to its cylindrical portion in order to meet this requirment is by electron-beam-welding, although other means for sealing may be utilized.

Other more general requirments for the outer housing, however, are that the housing material be compatible with body fluids and that its weight be carefully taken into consideration, the total battery weight not to significantly exceed 1 kg. Titanium, because of its high strength/weight ratio and its compatibility with the body, is the preferred material for the outer housing, although some stainless steels might also be utilized. In addition, since it is preferred that the entire battery when completely constructed be coated with a pliable material such as Silastic, a silicone-rubber commonly used for coating man-made objects implanted in the human body to help avoid body rejection, aluminum could also be utilized for the outer housing material so long as it is protected from direct contact with body fluids, for it has been found that aluminum is not particularly compatible with the internal body environment. However, it is preferred not to rely solely on such coating materials for protection of the outer housing. While the size and weight specifications for the outer housing may vary considerably due to the particular material utilized, the particular embodiment and battery shape selected, and other variables, the outer housing in accordance with the embodiment illustrated in the figure has an outer diameter of 10.0 cm., a thickness of 1.0 mm., a height of 8.75 cm., a volume (with insulation) of 686 cm.$^3$ and a weight of 117 grams.

The inner housing serves the purpose of maintaining the individual electrochemical cells in good electrical contact, providing secondary containment of cell chemicals and providing a smooth surface to enable even loading of the thermal insulation. The bottom and cover are preferably electron-beam-welded to the cylindrical portion of the housing, with the inner housing being sealed under a $10^{-4}$ Torr vacuum. Because the vacuum within both inner and outer housings is about $10^{-4}$ Torr, the inner housing is not subjected to differential pressure during battery operation. Therefore, the choice and thickness of the inner housing material is dictated only by fabrication considerations which include being a good electrical conductor, supporting the compressive forces from the resilient member and being corrosion-resistant to the secondary electrochemical cells' reactant materials, for example selenium and lithium. This last consideration is extremely important, because the integrity of the inner housing must be maintained in the event of a slowly leaking electrochemical cell. Otherwise, the leaking reactants would corrode through the inner housing and partially destroy the thermal insulation between the housings requiring battery shutdown and removal from the patient. However, with a housing material which is corrosion-resistant to the electrochemical cells' reactant materials, a slowly leaking cell would merely cause a somewhat decreased maximum power availability as well as a decreased battery lifetime rather than complete battery shutdown or inoperability.

The preferred material for the inner housing is nickel. A variety of other known materials might also be utilized, including but not limited to niobium, molybdenum and niobium-1% zirconium alloy. The weight and size specifications are, like the outer housing, dependent upon a number of variables. The inner housing illustrated in the embodiment shown in the figure, however, has an inner diameter of 7.9 cm., an inner height of about 7.55 cm. (the battery having 5 electrochemical cells, each 1.35 cm. thick), a material thickness of about 0.8 mm. (material thinner than this would most likely not meet the minimal strength requirements) and a weight of about 50–60 grams.

It should further be noted that in an embodiment of the invention not illustrated, the cover of the inner housing is in electrical contact with the upper surface of the uppermost electrochemical cell and is thereby utilized as one electrode terminal, such as the positive terminal, while the bottom of the inner housing is utilized as the opposite electrode terminal. This configuration eliminates the necessity of a feedthrough located in the inner housing's cover. To achieve this, however, the bottom of the inner housing must be electrically insulated from the cover. One possible means of achieving this is by sealing the bottom and/or the cover to the cylindrical portion of the inner housing with a high-temperature-resistant electrically insulating seal rather than electron-beam-welding. To date, however, experiments with a polyimide seal for this purpose have not been completely satisfactory because of partial breakdown of the seal at the high operating temperatures.

The electrical insulation layer located between the sides of the electrochemical cells and the cylindrical portion of the inner housing insures against possible short-circuiting of the battery. This layer, approximately 1 mm. thick, must be electrically insulating, flexible, resistant to the high operating temperature of the cells and have some resistance to the electrochemical cells' reactant materials in case of a slowly leaking cell. Materials which meet these requirements are Kapton (a polyimide), alumina cloth (threads or fibers of alumina woven into a cloth) and quartz cloth. In addition, other materials including the polyimide family are promising materials for such utilization, although alumina cloth is preferred.

The separating member interposed between the uppermost electrochemical cell and the inner housing cover must be capable of bearing the compressive force exerted on the cells by the resilient member while maintaining the proper spacing between the uppermost cell and the inner housing cover. It must also be resistant to the electrochemical cells' reactant materials and, with the particular embodiment illustrated in the figure, electrically insulating. There are a wide variety of materials which may be utilized, a few being alumina, boron, nitride and beryllia. Due to beryllia's high resistance to selenium (the cathode reactant of the electrochemical cells of U.S. patent application Ser. No. 73,830), beryllia is the preferred material for the illustrated embodiment. While the form or geometry of the separating member is optional and not critical to the invention, a ring geometry as illustrated in the figure is the simplest and therefore preferred. The dimensions of the illustrated ring are 4.5 to 5 cm. outer diameter, 6 mg. cross-sectional width and 3 mm. thickness (height).

The resilient member located between the lowermost electrochemical cell and the inner housing's bottom must be capable of retaining its strength and resiliency at the high operating temperatures of the cells. It must also be corrosion-resistant to the electrochemical cells' reactant materials. A force of about 6.8 kg. total loading against the electrochemical cells is utilized, although this is not an optimum figure. Using the particular battery geometry illustrated in the figure, a 0.5 cm. space is required for the resilient member which is in the form of a corrugated-shaped strip. There is a variety of materials capable of meeting the requirements of the resilient member, among these being nickel, Inconel Alloy X–750 (a nickel alloy consisting of 73 weight percent (w/o) Ni, 15.5 w/o Cr, 7.0 w/o I, 2.5 w/o Ti, 0.7 w/o Al, 0.4 w/o C and 0.9 w/o others) and Hastelloy-X (a nickel alloy consisting of 47.3 w/o Ni, 22.0 w/o Cr, 18.0 w/o I, 9.0 w/o Mo, 1.5 w/o Co, 0.6 w/o W, 0.1 w/o C and 1.5 w/o others). The Inconel-X nickel alloy, however, is preferred.

A further requirement for the resilient member, utilizing the particular battery configuration of the embodiment illustrated in the figure, is that it also be a good electrical conductor. As illustrated, the resilient member contacts the bottom surface, having a negative potential, of the lowermost electrochemical cell. Thus, this negative potential is imparted to the entire inner housing through the resilient member. This negative potential is further imparted to the outer housing through the support wires. This results in the entire outer housing acting as the battery's negative terminal, to which is attached the negative lead.

The operational temperature of the electrochemical cells is about 375°–400° C. Once this temperature has been reached and the cells are operational, this temperature level is maintained with heat generated by the electrochemical cells resulting from internal resistance therein, this heat energy amounting to 2 to 3 watts total. In order to insure proper battery operation, however, the heat generated by the cells must be removed. Therefore, the heat loss must be about equal to the heat generation. If the heat loss rate is less than the heat generation rate, the temperature within the battery will continue to increase beyond the operational level, eventually causing malfunction and inoperability. If, however, the heat loss rate is greater than the heat generation rate, the temperature will continually fall below that of the operational level. While the thermal switch is designed to aid in this situation (as explained below), the battery's lifetime will nonetheless be significantly reduced. If the heat loss rate is sufficiently greater than the heat generation rate, the thermal switch will be unable to compensate for this discrepancy, and the battery will become inoperative due to the solidification of the electrochemical cells' constituent materials. Therefore, the function of the thermal insulation between the two housings is extremely important to the battery's operation.

A major portion of the heat loss occurs through the support wires and the positive electrical lead illustrated in the figure with the remaining heat loss, amounting to a fraction of one watt, occurring through the thermal insulation. Therefore, the thermal insulation material must allow for only a fraction of one watt to be lost through it, yet it must also be lightweight. Some lightweight, high-efficiency, multifoil vacuum insulation materials which meet this requirement are aluminized polyimides including aluminized Kapton, aluminum foil alternated with glass paper, and zirconia sputtered onto tantalum foil. However, other multifoil vacuum insulations, though not commercially available, may be constructed so as to meet these requirements. Because the Kapton outgases slowly, the aluminum foil alternated with glass paper is a preferred material. In accordance with the embodiment illustrated in the figure, the thickness of the insulation is 1 cm. while having a weight of about 80 grams, there being typically 30 layers in the 1 cm. space. The number of layers, however, is arbitrary and dependent on the material utilized and the thickness of the individual layers.

The support wires illustrated in the figure are for the purpose of immobilizing the inner housing within the outer housing. While other systems of support may be utilized, this particular system is preferred because it affords the least amount of contact between the two housings, thereby maintaining heat dissipation at a minimum. As illustrated in the figure, three wires extend from the inner housing's cover-cylindrical portion juncture to the outer housing, while three wires similarly extend from the inner housing's bottom-cylindrical portion juncture to the outer housing. The wires are secured equidistantly about the inner housing's cover and bottom. The wires are under sufficient tension to securely hold the inner housing in position relative to the outer housing regardless of the battery's position, yet the tension should not be so great as to cause the wires to break should the battery receive a jolt. In order to achieve maximum immobilization efficiency, the wires should extend outward from the inner housing at approximately 45° above (for the upper wires) and below (for the lower wires) the planes of the cover and bottom portions respectively, although deviation therefrom may be made.

Means for securing the support wires to the housings are numerous. One manner, as illustrated in the figure, provides for the wires extending through perforations in both housings with enlarged portions located at both ends of each wire. Another manner of attachment provides for spot welding the inner end of the wires to the outer surface of the inner housing in lieu of passing the wires through the inner housing. This latter manner eliminates perforations in the inner housing, thereby aiding in maintaining the inner housing's integrity. However, the spot weld must be sufficiently strong to withstand the wires' tension throughout the battery's lifetime.

The choice of materials for the support wires is also quite varied. The important requirement is that the material have a low thermal conductivity so as to insure against excessive heat loss through the wires. The material should also be a good electrical conductor for reasons previously explained. If the manner of securing the wires to the inner housing is such that the wires pass through and into the inner housing, then it is preferable that the wire material be corrosion-resistant to the electrochemical cells' reactant materials as well as resistant to the high operating temperatures. If the wires are spot welded to the inner housing's outer surface, then it is preferable that the wire material be of the same type as that utilized for the inner housing for weldability purposes. Such materials which may be utilized for the support wires include but are not limited to stainless steels and their alloys, and high metals alloys having low thermal conductivities such as Hastelloy, Nichrome (a nickel-chrome alloy) or Inconel Alloy X–750.

The feedthroughs illustrated in the figure, weighing about 20 grams total, are constructed from glass or ceramic, although other materials may be utilized which meet the necessary requirements. The purpose for the feedthroughs is to enable the electrical lead to pass through the covers of both housings without compromising the integrity thereof. The requirements for the inner feedthrough, that mounted in the cover portion of the inner housing, are that it must be electrically insulating at the high operating temperatures, must be resistant to the high operating temperatures and to the electrochemical cells' reactant materials, and it must be well sealed to prevent the transfer of materials in or out of the inner housing. The preferred materials for the inner feedthrough are yttria or calcium zirconate. The outer feedthrough requirements, being somewhat less stringent, are that it must be vacuum-tight to at least $10^{-4}$ Torr, must be electrically insulating, although not necessarily at the cells' high operating temperatures since it is not subjected thereto, and must be compatible with body fluids. Most any type of ceramic as well as glass can be utilized for the outer feedthrough. While it is preferred that the feedthroughs be brazed to the metallic housing covers, any method of securing them therto is sufficient if the stated requirements can be met. Further, as previously disclosed, the inner feedthrough can be eliminated through the use of another embodiment not illustrated in the figure.

The electrical leads should be constructed from material which will keep the voltage drop along the leads to a minimum. Also, the diameter and length of the lead which penetrates the battery and passes through the feedthroughs must be such that the heat loss through this lead is kept to a minimum. Further, that portion of the battery-penetrating lead which is within the inner housing should be corrosion-resistant to the electrochemical cells' reactant material, resistant to the high operating temperatures and easily spot-welded to the upper surface of the uppermost electrochemical cell. That portion of the battery-penetrating lead which passes through the multifoil thermal insulation should be enclosed in a temperature-resistant insulation, such as ceramic sleeving. The portions of both leads which are exposed to the body's environment should be resistant thereto, either through utilizing a properly resistant material or preferably by insulating those portions of the leads from the body environment. While there are a variety of materials which meet such requirements for use as the electrical leads, niobium is preferred due to the fact that niobium is also utilized as the upper surface material of the electrochemical cells according to U.S. patent application Ser. No. 73,830.

The thermal switch and heater wire are utilized for initial battery startup as well as in the event of a decrease in battery temperature below 375°–400° C. during operation. The thermal switch is merely a thermostat preset to open at about 375° C. Any number of commercially available thermostats may be utilized, although the thermal switch and its components must be resistant to the high operating temperatures. The particular thermal switch illustrated in the embodiment of the figure is approximately 2 cm. in diameter and 1 cm. thick, not including the terminals. Its weight is about 30 grams. The critical requirement for the heater wire is that it must be capable of dissipating about 4 watts of heat at the terminal voltage of the battery, the terminal voltage itself depending on the number of electrochemical cells utilized in the battery. This affords considerable flexibility in length and diameter choice for the heater wire, for such will depend upon the 4 watt dissipation requirement and the electrical resistivity of the material utilized for the wire. There is a wide variety of length and diameter combination possible depending upon the material chosen. Preferred materials are refractory metals which are easily worked, including nickel-chrome alloys, molybdenum, niobium and platinum. An example of an appropriate length and diameter choice for a 4 cell battery having a terminal voltage of 8 volts is a molybdenum heater wire 300 cm. long having a diameter of 0.0088 inch, molybdenum having a resistivity of $21 \times 10^{-6}$ ohms at 400° C. The heater wire must be electrically insulated from the inner housing except at the end which is secured to the inner housing's outer surface. There must also be good thermal contact between the heater wire and the inner housing. The heater wire illustrated in the figure weighs approximately 20 grams.

As further illustrated in the figure, the thermal switch is connected to the positive lead and the heater wire. Initially, the battery is at room temperature and inoperative with the electrochemical cells' reactants frozen and the thermal switch closed. When an electric current is applied from an outside source to the battery leads, the current cannot pass through the frozen cells. It therefore passes through the thermal switch and heater wire. The 4 watts dissipated by the heater wire increases the temperature of the electrochemical cells to 375°–400° C. When this temperature is obtained, the thermal switch opens thereby interrupting the current through the heater wire, the external power source then being disconnected from the battery leads. At this point, however, the electrochemical cells are active and thus generate a current through the battery leads while creating their own heat. The battery is then ready for implantation. If at any time during battery operation the temperature falls below the preset temperature level, the thermal switch automatically closes and thereby diverts some of the output current from the electrochemical cells through the heater wire until the temperature once again reaches the preset 375°–400° C. It should be noted, however, that this diversion of current will increase the power demand from the electrochemical cells if the same power output is to be maintained at the battery leads. Such an increased power demand may shorten the lifetime of the electrochemical cells and the battery.

While the figure illustrates a battery having five electrochemical cells of the type disclosed in U.S. patent application Ser. No. 73,830, the invention is not limited to this particular type nor number. Since the battery is to be implanted, it should be as lightweight and compact as possible, and with present electrochemical cell technology, a battery utilizing only four electrochemical cells can be constructed in accordance with the disclosed invention and still meet the performance requirements. Future developments in secondary electrochemical cell technology will most likely enable a further reduction in the number of individual cells required for use in the present invention. Some of the more important individual electrochemical cell requirements for use in the present invention are given in the table below for both a five-cell and a four-cell battery.

INDIVIDUAL ELECTROCHEMICAL CELL REQUIREMENTS FOR USE IN A 1 KG. IMPLANTABLE BATTERY

| Cell requirement | Five-cell battery | Four-cell battery |
| --- | --- | --- |
| Open-circuit voltage, v | 2.1 | 2.1 |
| Average operating voltage, v | 1.6 | 1.6 |
| Average cell power, watts | 6.0 | 7.5 |
| Current density, a./cm.$^2$ | 0.12 | 0.15 |
| Capacity density, a.-hr./cm.$^2$ | 0.48 | 0.60 |
| Power density, w./cm.$^2$ | 0.20 | 0.24 |
| Specific power, w./kg | 36.6 | 36.6 |
| Specific energy, w.-hr./kg | 146.4 | 146.4 |
| Cell weight, g | 164 | 205 |

A 1 kg. secondary electrochemical battery constructed in accordance with the present invention, utilizing therein either four or five individual secondary electrochemical cells as described in the table, is capable of storing about 120 w.-hr. of energy while delivering a power of about 30 w. over a cycle life of greater than 1100 cycles. Such a performance is more than sufficient to meet the requirements of an implantable power source for an artificial heart, and it is expected that as experience with secondary electrochemical batteries increases, the cycle life and cycle duration will be extended even further.

It should be noted that the particular battery configuration as illustrated by the embodiment of the figure, while capable of meeting the performance requirements for an implantable battery powering an artificial heart, is most likely not the best shape for total implantation in an average-sized human chest cavity. A somewhat different configuration, such as having two stacks of two electrochemical cells per stack next to each other in lieu of four cells in one stack, would most likely be utilized for actual implantation into a human. However, the illustrated configuration and shape is quite sufficient for implantation into larger animals, such as a calf, for testing or other purposes, and it is additionally capable of various other uses not requiring implantation. Further, a reduction in the present inefficiencies of the auxiliary equipment associated with an artificial heart would enable the use of an implantable battery according to the present invention having a specific power considerably less than the presently required 30 w./kg. This would enable the embodiment illustrated in the figure to be reduced in size sufficiently to allow a battery having the illustrated shape to be totally implanted in an average-sized human.

It will be understood that the invention is not to be limited to the illustrated embodiment or the details given herein but that it may be modified within the scope of the appended claims.

The embodiments of the invention in which an exclusive property or privilege is claimed are defined as follows:

1. An implantable secondary electrochemical battery comprising:
   (a) an enclosed, evacuated cylindrical inner housing disposed within an enclosed, evacuated cylindrical outer housing;
   (b) a plurality of electrically conducting wires under tension securely attached to and extending between said inner and outer housings and maintaining electrical contact along with a constant spaced relationship therebetween;
   (c) a plurality of sealed, lithium-selenium secondary electrochemical cells aligned in a single stack and immobilized within said inner housing, said electrochemical cells being electrically connected in series;
   (d) thermal insulation disposed within the space between said inner and outer housings;
   (e) a layer of electrically insulating material interposed between the sides of said electrochemical cells and the inner surface of said inner housing;

(f) an electrically insulating spacing member of beryllia interposed between the cover portion of said inner housing and the electrochemical cell adjacent and closest thereto;

(g) a resilient member of electrically conducting, nickel-chromium alloy interposed between the bottom portion of said inner housing and the electrochemical cell adjacent and closest thereto, said resilient member exerting pressure in electrical contact with said closest electrochemical cell so as to force said stacked electrochemical cells toward and against said spacing member;

(h) an electrically insulating feedthrough mounted in the cover portion of said outer housing;

(i) an electrically insulating feedthrough mounted in the cover portion of said inner housing;

(j) an insulated electrical lead passing through said feedthroughs and electrically connected to said electrochemical cell adjacent and closest to cover portion of said inner housing;

(k) an insulated electrical lead electrically connected to the outer surface of said outer housing;

(l) a thermal switch disposed between said inner and outer housings, said thermal switch having two electrical terminals with one of said terminals electrically connected to said electrical lead passing through said feedthroughs; and (m) an electrically insulated heater wire wrapped around the outer surface of said inner housing with one end of said heater wire electrically connected thereto and the second end of said heater wire electrically connected to the second electrical terminal of said thermal switch.

2. The battery according to claim 1 wherein said support wires, under tension, extending between said inner and outer housings comprise three support wires extending from the juncture of the cover and cylindrical portions of said inner housing to said housing, said wires being secured equidistantly around the cover portion of said inner housing, and three support wires extending from the juncture of the bottom and cylindrical portions of said inner housing to said outer housing, said wires being secured equidistantly around the bottom portion of said inner housing.

3. The battery according to claim 1 wherein said thermal insulation disposed within the evacuated space between said inner and outer housings comprises a multifoil vacuum insulation material having a sufficient number of layers to effectively maintain a temperature of 375°–400° C. within said inner housing during operation of said battery.

4. The battery accordinng to claim 3 wherein said multifoil vacuum insulation material is selected from the group consisting of aluminized polyimides and aluminum foil alternated with glass paper.

5. The battery according to claim 1 wherein said thermal switch is operative in the temperature range of 375°–400° C., and wherein said heater wire has a sufficient length and diameter so as to effectively dissipate 4 watts of heat energy when a current is passed therethrough.

6. The battery according to claim 1 wherein said plurality of secondary electrochemical cells comprises five of said cells.

7. The battery according to claim 1 wherein said plurality of secondary electrochemical cells comprises four of said cells.

8. The battery according to claim 1 wherein said outer housing is encased in a pliable layer of material chemically compatible with the internal environment of the human body.

9. An implantable secondary electrochemical battery comprising:

(a) an enclosed, evacuated, cylindrical outer titanium housing, said outer housing being capable of withstanding an external pressure of about 15 p.s.i. and encased in a pliable layer of silicone-rubber;

(b) an enclosed, evacuated, cylindrical inner nickel housing disposed within said outer housing;

(c) three upper support wires, under tension, attached to and extending between said inner and outer housings, said upper support wires secured equidistantly about the juncture of the cover and cylindrical portions of said inner housing and extending outward therefrom to said outer housing at an angle of approximately 45° above the plane of the cover portion of said inner housing;

(d) three lower support wires, under tension, attached to and extending between said inner and outer housings, said lower support wires secured equidistantly about the juncture of the bottom and cylindrical portions of said inner housing and extending outward therefrom to said outer housing at an angle of approximately 45° below the plane of the bottom portion of said inner housing;

(e) five sealed, high-temperature secondary electrochemical cells aligned in a single stack and immobilized within said inner housing, said electrochemical cells being electrically connected in series, each of said cells having a specific power of about 36.6 w./kg. and a specific energy of about 146.4 w.-hr./kg.;

(f) multifoil vacuum thermal insulation disposed within the space between said inner and outer housings, said insulation comprising about 30 layers of aluminum foil alternated with glass paper so as to effectively maintain a temperature of 375°–400° C. within said inner housing during operation of said battery;

(g) a layer of electrically insulating alumina cloth interposed between the sides of said electrochemical cells and the inner surface of the cylindrical portion of said inner housing;

(h) a beryllia spacer ring interposed between the cover portion of said inner housing and the electrochemical cell adjacent and closest thereto;

(i) a resilient member interposed between the bottom portion of said inner housing and the electrochemical cell adjacent and closest thereto, said resilient member comprising a corrugated-shaped nickel alloy strip having sufficient resiliency so as to effectively exert a total loading of about 6.8 kg. upon said stacked electrochemical cells;

(j) an electrically insulating, vacuum-tight outer feedthrough mounted in the cover portion of said outer housing, said outer feedthrough being selected from the group consisting of ceramic and glass;

(k) an electrically insulating, high-temperature-resistant inner feedthrough mounted in the cover portion of said inner housing, said inner feedthrough being selected from the group consisting of yttria and calcium zirconate;

(l) an insulated niobium electrical lead passing through said outer and inner feedthroughs and electrically connected to said electrochemical cell adjacent and closest to the cover portion of said inner housing;

(m) an insulated niobium electrical lead electrically connected to the outer surface of said outer housing;

(n) a thermal switch, operative at a temperature of 375°–400° C., disposed between said inner and outer housings, said thermal switch having two electrical terminals with one of said terminals electrically connected to said electrical lead passing through said feedthroughs; and (o) an electrically insulated heater wire wrapped around the outer surface of the cylindrical portion of said inner housing with one end of said heater wire electrically connected thereto and the second end of said heater wire electrically connected to the second electrical terminal of said thermal switch, said heater wire being comprised of a material selected from the group consisting of nickel-chrome alloy, molybdenum, niobium and platinum, and having a sufficient length and diameter so as to effectively dissipate approximately 4 watts of heat energy when a current is passed therethrough.

References Cited

UNITED STATES PATENTS

| | | | |
|---|---|---|---|
| 1,266,780 | 5/1918 | Edison | 136—161 |
| 1,866,517 | 7/1932 | Heylandt | 220—9 LG |
| 3,597,276 | 8/1971 | Jammet | 136—111 |
| 3,042,733 | 7/1962 | Toda et al. | 136—110 |
| 2,934,580 | 4/1960 | Neumann | 136—111 X |
| 2,666,091 | 1/1954 | Martin et al. | 136—161 |
| 3,110,633 | 11/1963 | Bachmann | 136—161 |
| 3,424,622 | 1/1969 | Dechert | 136—161 |
| 3,531,324 | 9/1970 | Fischer et al. | 136—20 |
| 2,352,759 | 7/1944 | Baum | 136—133 |
| 2,780,350 | 2/1957 | Simon et al. | 206—46 FC |

ANTHONY SKAPARS, Primary Examiner

U.S. Cl. X.R.

136—83 T, 112, 166